United States Patent [19]

Cho

[11] Patent Number: 5,929,768
[45] Date of Patent: Jul. 27, 1999

[54] MULTI-REMOTE CONTROLLER CIRCUIT HAVING AUTOMATIC SETTING FUNCTIONS

[75] Inventor: Byung-Hyuk Cho, Suwon, Rep. of Korea

[73] Assignee: Samsung Electronics Co., Ltd., Kyungki, Rep. of Korea

[21] Appl. No.: 08/841,622

[22] Filed: Apr. 30, 1997

[30] Foreign Application Priority Data

Jul. 15, 1996 [KR] Rep. of Korea ................... 96-28584

[51] Int. Cl.$^6$ ................... G05B 19/02; G08C 19/00; H04B 1/18
[52] U.S. Cl. ................... 340/825.22; 340/825.69; 340/825.72; 455/151.4; 455/151.1
[58] Field of Search ................... 340/825.22, 825.69, 340/825.72, 539, 825.39; 341/176; 455/151.4, 151.1, 151.2, 92; 371/377; 374/102.7

[56] References Cited

U.S. PATENT DOCUMENTS 4,774,511  9/1988  Rumbolt et al. ................... 340/69

Primary Examiner—Michael Horabik
Assistant Examiner—Anthony A. Asongwed
Attorney, Agent, or Firm—Sughrue, Mion, Zinn, Macpeak & Seas, PLLC

[57] ABSTRACT

A multi-remote controller circuit for selecting a manufacturer of an object to be controlled. The multi-remote controller circuit has: a key matrix including an automatic setting key, numeric keys, and various keys for automatic selection of a manufacturer of the control object; a light emitting unit for receiving data corresponding to the selected key of the key matrix and outputting a corresponding pulse wave; a light receiving unit for detecting a power-on/off state of the control object; and a controller for proceeding to a manufacturer selection mode in response to activation of the automatic setting key, sequentially applying data of different manufacturers for power-on/off of the control object to the light emitting unit according to a preset manufacturer selection table, and upon detection of a signal by the light receiving unit of a change in the power on/off state of the control object, setting the manufacturer of the control object.

8 Claims, 4 Drawing Sheets

| NO. | MAKER SELECTION | MAKER |
|---|---|---|
| 1 | TV + 1 | A |
| 2 | TV + 2 | B |
| 3 | TV + 3 | C |
| 4 | TV + 4 | D |
| 5 | TV + 5 | E |
| 6 | TV + 6 | F |
| 7 | TV + 7 | G |
| 8 | TV + 8 | H |
| 9 | TV + 9 | I |

| NO. | MAKER SELECTION | MAKER |
|---|---|---|
| 1 | TV + 1 | A |
| 2 | TV + 2 | B |
| 3 | TV + 3 | C |
| 4 | TV + 4 | D |
| 5 | TV + 5 | E |
| 6 | TV + 6 | F |
| 7 | TV + 7 | G |
| 8 | TV + 8 | H |
| 9 | TV + 9 | I |

*Fig. 1*

MULTI-REMOTE CONTROLLER CIRCUIT HAVING AUTOMATIC SETTING FUNCTIONS

BACKGROUND OF THE INVENTION

1. Field of the Invention

The present invention relates to a circuit for use in a multi-remote controller having integrated functions and, more specifically, to a multi-remote controller circuit having a function which automatically sets the manufacturer of a device which is to be controlled.

2. Description of the Related Art

A multi-remote controller has the capability to integrally control all electronic products produced by various manufacturers using a single remote controller.

In general, when a user sets a multi-remote controller to select a manufacturer of a television set, the user has to first personally check the manufacturer of the television set. An example of a multi-remote controller which operates televisions produced by nine manufacturers is shown in FIG. 1. To select a manufacturer, the user should press and select a TV selection key 1 in a key matrix 10 as shown in FIG. 2 and a key number corresponding to the manufacturer as shown in the table of FIG. 1. After scanning the above key, a controller 20 radio-transmits a signal corresponding to the manufacturer associated with the pressed key number through a light emitting unit D1 disposed within a transmitter 30, to a light receiving unit of the television. Accordingly, remote control operation of a TV (or other device such as a video cassette recorder) produced by a specific manufacturer can be performed by the multi-remote controller as described above.

After the user purchases a multi-remote controller like the one described above, when the user sets the multi-remote controller for the manufacturer of the unit to be controlled it is necessary to press the selection key and the numeral key of the key matrix 10 which corresponds to the manufacturer. This is inconvenient, especially if the user is not familiar with the operation of the multi-remote controller or does not know the number of the key which corresponds to the unit manufacturer. Also, if the user does not know the manufacturer of the unit, he must try each numeral key until a key is activated which operates the unit.

SUMMARY OF THE INVENTION

It is an object of the present invention to provide a multi-remote controller circuit which does not have the above-described disadvantages.

It is an another object of the present invention to provide a multi-remote controller circuit which allows a user to simply and conveniently select a manufacturer of a unit to be controlled.

It is a further object of the present invention to provide a multi-remote controller circuit for automatically setting the multi-remote controller according to the manufacturer of the unit to be controlled.

In order to achieve the above objects, the present invention is provided with a multi-remote controller circuit, comprising: a key matrix including an automatic setting key, numeric keys, and various keys for automatic selection of a manufacturer; a light emitting unit for receiving the data corresponding to the selected key of the key matrix and radio-outputting a given pulse wave; a light receiving unit for detecting a power-on/off state of a control object; and a controller for proceeding to a manufacturer selection mode in response to activation of the automatic setting key, sequentially applying the data for power-on/off of the control object by the manufacturer selection numbers to the light emitting unit according to a preset manufacturer selection table, and upon detection of a signal indicating that the light receiving unit is turned on/off, setting the manufacturer of the control object to a selection number.

BRIEF DESCRIPTION OF THE DRAWING

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 1 is an example of a table which relates manufacturers to respective selections;

DETAILED DESCRIPTION OF THE PREFERRED EMBODIMENT(S)

Hereinafter, the present invention will be explained in detail in conjunction with the accompanying drawings.

Figure 2:
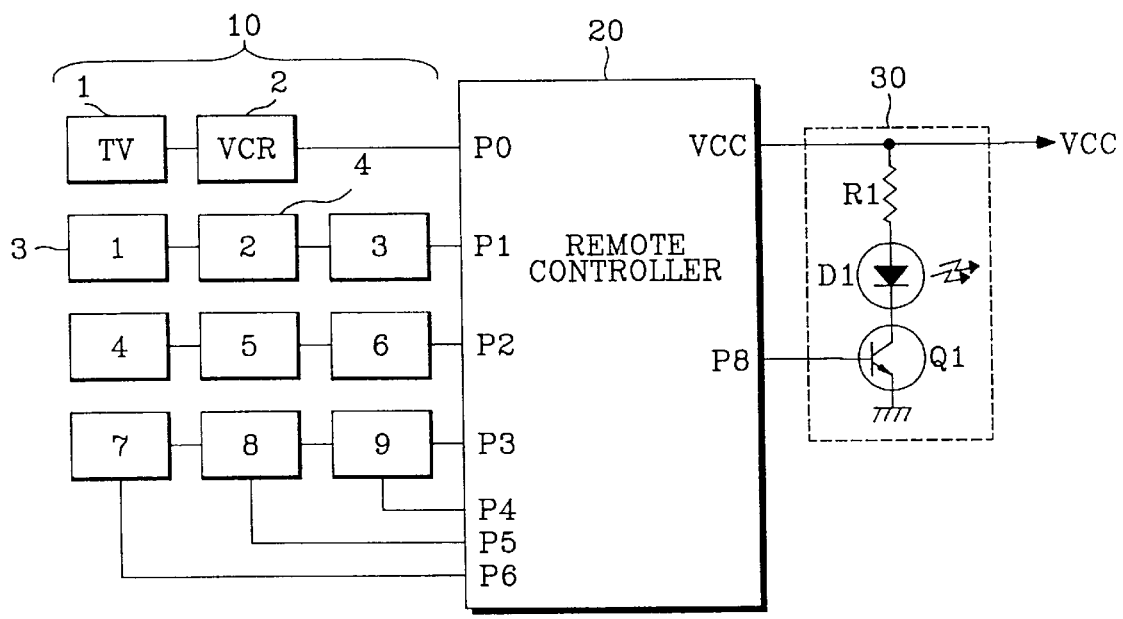
FIG. 2 is a circuit diagram showing a prior art multi-remote controller.
Figure 3:
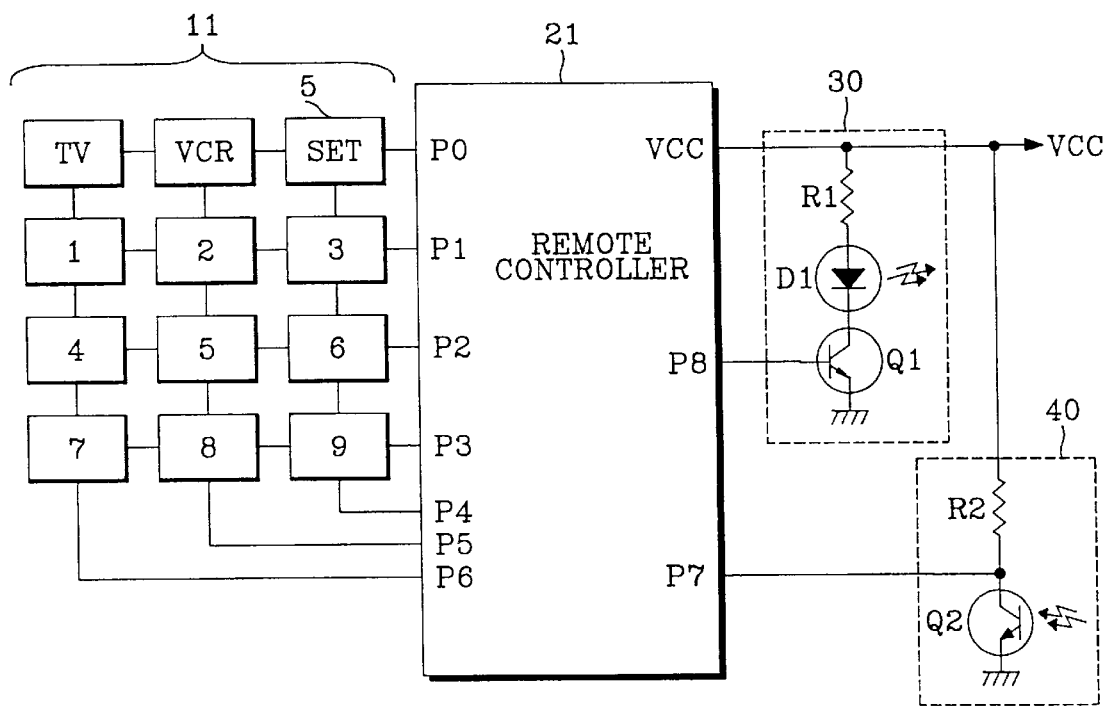
FIG. 3 is a circuit diagram showing a multi-remote controller according to the present invention.
Figure 4:
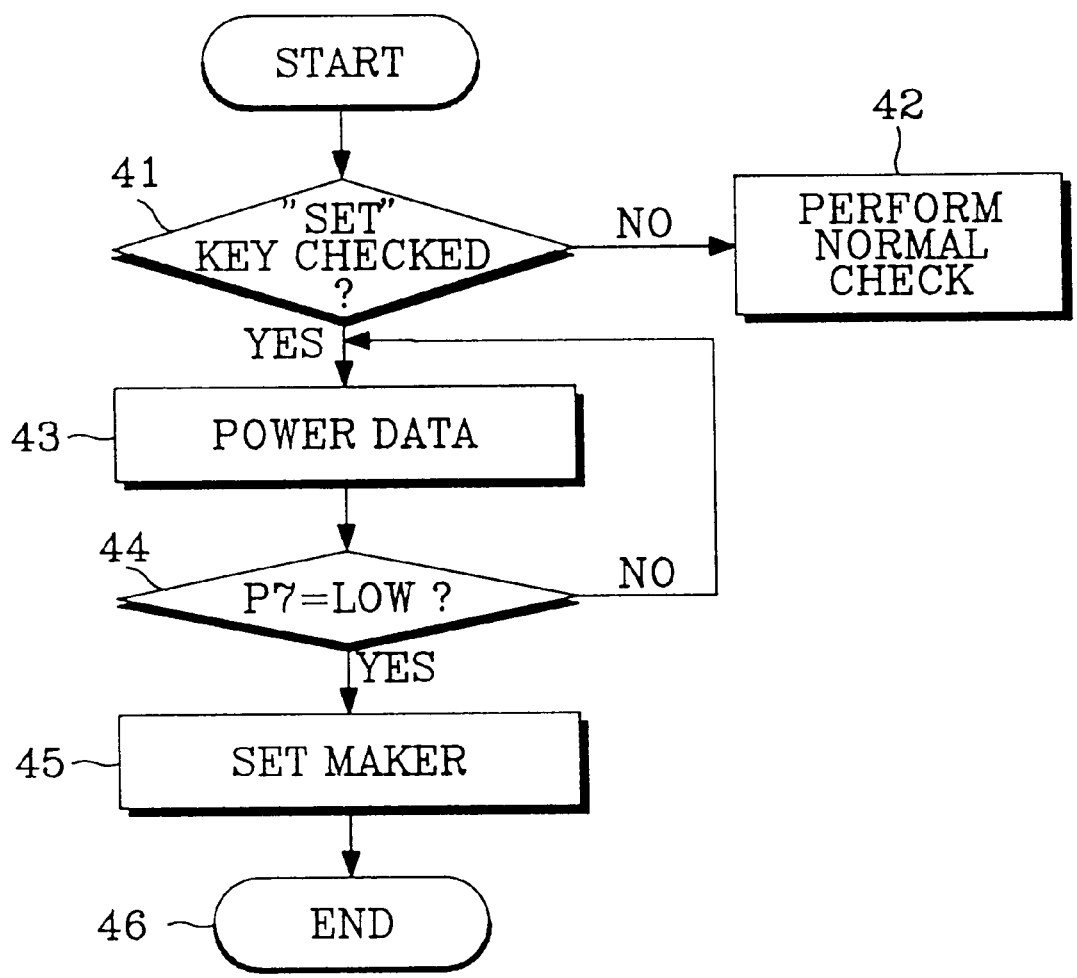
FIG. 4 is a control flowchart showing automatic setting processes performed by the circuit of FIG. 3.

FIG. 4 is a control flowchart showing automatic setting processes performed by the circuit of FIG. 3. The circuit of FIG. 3 includes: a key matrix 11, a controller 21, a light emitting unit 30 and a light receiving unit 40. As depicted in FIG. 3, in comparison with the key matrix 10 of FIG. 2, the key matrix 11 is further composed of a set key 5, a resistor R2, and a photo transistor Q2, the resistor R2 and the photo transistor Q2 constituting the light receiving unit 40. Further, the controller 21 stores a program in an internal memory for performing the flow processes shown in FIG. 4. Transmitter 30 has a resistor R1, an infrared line diode D1, and a driving transistor Q1. Transistor Q1 outputs pulse waves of a given infrared wavelength according to data applied to its base.

Following is a more specific explanation of the construction of FIG. 3, after which is an explanation of the operation of controlling the controller 21 to perform the flow process of FIG. 4.

In FIG. 3, the "TV" key and the "VCR" key of the key matrix 11 correspond to a key used for selecting between a TV mode and a VCR mode. Also, a "SET" key is an automatic setting key and "1", "2", "3", "4", "5", "6", "7", "8", and "9" keys are numeric keys.

P0, P1, P2, P3, P4, P5, and P6 of the controller 21 denote ports for checking operation of the keys, and P7 denotes a port for determining whether or not the manufacturer of the unit to be controlled is selected by checking the inputs of the resistor R2 and the photo transistor Q2 in the light receiving unit 40. In addition, P8 is a port for outputting data of a given pulse wave. R1 of the light emitting unit 30 denotes a resistor and D1 denotes the infrared diode. Furthermore, Q1 is switched on/off in response to the data outputted from the port P8 of the controller 21. R2 of the light receiving unit 40 sets the port P7 of the controller 21 to a logic "high" state in a conventional operation mode, and Q2 checks whether or not a photo input detection component is turned on/off indicating an operation state of a television monitor. When the monitor is turned on, Q2 is turned on depending upon the amount of the light emitted therefrom and the port P7 changes to a logic "low" state.

In the manufacturer selection mode, the data for powering on a control object in response to the activation of the automatic setting key is applied to the light emitting unit 30 corresponding to the manufacturer selection numbers of a preset manufacturer selection table, and the controller 21 controls the performance of all steps shown in FIG. 4. The manufacturer of the control object is set when light receiving unit 40 detects a signal indicating that the control object is powered on.

That is, in step 41, the controller 21 checks whether or not the "SET" key is pressed. In the manufacturer selecting mode, the user activates the automatic setting key 5. Also, the port P7 maintains its logic "high" state upon performance of the step 41. Thus, when it is determined that the "SET" key has been pressed, the controller 21 performs step 43, thereby outputting the power-on/off data of the manufacturer "A" as illustrated in FIG. 1 to the port P8. Following that, the controller 21 checks in step 44 whether or not the input of the port P7 is in a logic "high" state. Here, when the input of the port P7 is determined to be in the logic "high" state, the controller 21 outputs the power-on/off of the manufacturer "B" of FIG. 1 to the port P8, thereby proceeding to the aforesaid step 44. As a result, the controller 21 continuously outputs the power-on/off data of the manufacturers A to I until the input of the port P7 is in the logic "low" level. Since an interval of the power-on/off data outputted per manufacturer is normally about tens of mS, even tens or more manufacturers can be automatically checked in less than a few seconds.

As is apparent from the foregoing, the present invention overcomes the need in the prior art to manually set the manufacturer of a device to be controlled, inasmuch as the manufacturer can be automatically set, even when a user does not know the manufacturer or the selection number of the manufacturer. Also, the present invention can automatically set the manufacturer even when the manufacturer is incorrectly selected.

It should be understood that the present invention is not limited to the particular embodiments described in this specification, except as defined in the appended claims.

What is claimed is:

1. A multi-remote controller circuit, comprising:

a key matrix including an automatic setting key;

a unit for outputting data;

a receiving unit for detecting a power-on/off state of an object to be controlled; and a controller which, in response to activation of said automatic setting key, sequentially applies data of different manufacturers for power-on/off of said object to be controlled to said unit for outputting data, and when said receiving unit detects that the power on/off state of the control object changes, sets multi-remote controller to the manufacturer of said object to be controlled.

2. The circuit as recited in claim 1, wherein said receiving unit is a light receiving unit comprising a resistor and a photo input detection component, said resistor and said photo input detection component being in turn connected between a power supply voltage and a ground voltage.

3. The circuit as recited in claim 1, wherein said controller is a micro-controller included with a program.

4. The circuit as recited in claim 1, wherein said key matrix comprises numeric keys.

5. The circuit as recited in claim 1, wherein said unit for outputting data is a light emitting unit which receives data corresponding to a selected key of said key matrix and outputs a corresponding pulse wave.

6. The circuit as recited in claim 1, wherein the data of different manufacturers for power-on/off of said control object is stored in a manufacturer selection table.

7. A method for automatically setting a manufacturer of an object to be controlled in a multi-remote controller circuit which has a key matrix including an automatic setting key, a unit for outputting data, and a detecting unit for detecting a power-on/off state of the object to be controlled, the method comprising the steps of:

proceeding to a manufacturer selection mode in response to activation of said automatic setting key;

sequentially applying data of different manufacturers for power-on/off of said object to be controlled to said unit for outputting data; and upon detection of a change in the power on/off state of said object to be controlled by the detecting unit, setting the multi-remote controller to the manufacturer of said object to be controlled.

8. The method as recited in claim 7, wherein the step of sequentially applying data of different manufacturers is performed according to a manufacturer selection table.

* * * * *